July 13, 1943.      H. E. HODGSON ET AL      2,324,211
DRIVES FOR VALVES AND THE LIKE
Filed April 10, 1939           5 Sheets-Sheet 1

Inventors.
Howard E. Hodgson
Clarence W. Kuhn
William C. Stevens
By Frank H. Hubbard
Attorney July 13, 1943.  H. E. HODGSON ET AL  2,324,211
DRIVES FOR VALVES AND THE LIKE
Filed April 10, 1939   5 Sheets-Sheet 2

Inventors.
Howard E. Hodgson
Clarence W. Kuhn
William C. Stevens
By Frank H. Hubbard
Attorney

July 13, 1943.  H. E. HODGSON ET AL  2,324,211

DRIVES FOR VALVES AND THE LIKE

Filed April 10, 1939  5 Sheets-Sheet 4

Inventors
Howard E. Hodgson
Clarence W. Kuhn
William C. Stevens
By Frank H. Hubbard
Attorney

Patented July 13, 1943

2,324,211

UNITED STATES PATENT OFFICE 2,324,211

DRIVE FOR VALVES AND THE LIKE

Howard E. Hodgson and Clarence W. Kuhn, Wauwatosa, and William C. Stevens, Milwaukee, Wis., assignors to Cutler-Hammer, Inc., Milwaukee, Wis., a corporation of Delaware Application April 10, 1939, Serial No. 267,142

15 Claims. (Cl. 192—150)

This invention relates to drives for valves and the like.

In practice valve drives preferably are of the unit type, and the present invention has among its objects to provide an improved drive of such unit type.

Another object is to provide a unit type drive for valves operable through the medium of a rotating nut coacting with an axially movable threaded stem, or a rotating threaded stem coacting with an axially movable nut, the drive having combined therewith in unit form yielding means to take the thrust of the rotating part whether it be the nut or the stem when it tends to move axially as the result of seating of the valve or as the result of contraction or expansion after seating of the valve.

Another object is to provide a unit type drive inclusive of such thrust taking means which will be applicable to valves varying in respect of the mounting thereon of its part to coact with said thrust taking means, such part optionally to be with or without a non-rotatable sleeve for co-ordinating said part and said thrust taking means.

Another object is to provide such a unit so constructed as to render its parts readily accessible for inspection and for desirable adjustments, as for example adjustment of the pressure springs of the thrust taking means.

Another object is to provide such a unit type drive having associated therewith a limit switch operable by axial movement of the valve operating nut through the medium of the thrust taking means.

Another object is to provide a fully enclosed unit inclusive of the thrust taking means and the aforementioned limit switch, the unit casing being rigidly attachable to the valve casing and the parts of the unit being immovable except as movements thereof are required for performance of their respective functions.

Another object is to provide a drive with improved means affording drive optionally by power or manual force.

More specific objects in respect of the last mentioned improvement include provision of means minimizing danger of interference between the power and manual forces and provision of means minimizing risks from carelessness on the part of the attendant in shifting from power drive to manual drive or vice versa.

Numerous other more specific objects and objects not hereinbefore touched upon will appear from the following specification and from the embodiments of the invention herein disclosed.

The accompanying drawings illustrate certain embodiments of the invention which will now be described, it being understood that the embodiments illustrated are susceptible of modification without departing from the spirit and scope of the appended claims.

Figure 1:
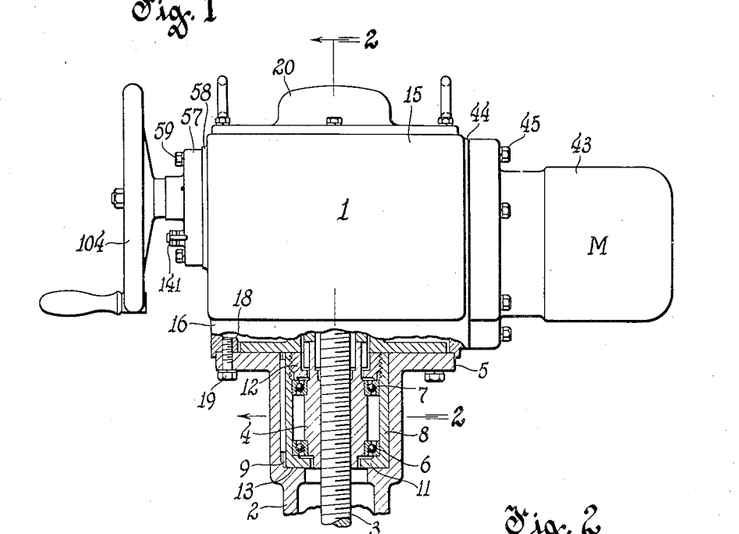
Figure 1 is a side elevational view of a valve operating unit embodying the invention, a portion of the enclosing casing being broken away and shown in section.

Referring to Fig. 1, the same illustrates a valve operating unit 1 embodying the invention, such unit being adapted for top mounting upon the yoke 2 of a valve having a non-rotatable stem 3 and an associated operating nut 4.

The top of yoke 2 is provided with a circular flange 5 concentric to the axis of stem 3, and nut 4 is rotatably supported by combined radial and thrust bearings 6 and 7 within a sleeve 8 which is slidably mounted within an opening 9 in the upper end of said yoke. Bearing 6 is held between a shouldered portion on the lower end of nut 4 and an inwardly extending flange 11 on the lower end of sleeve 8, and bearing 7 is held between a shouldered portion on the upper end of said nut and a thrust collar 12 threaded into the opening in said sleeve. Nut 4 is thus held against axial movement with respect to sleeve 8. Upon rotation of nut 4 in valve opening direction sleeve 8 tends to move downwardly and the lower end of said sleeve is held in engagement with a shoulder 13 formed on yoke 2, while the upper end thereof is substantially flush or slightly above the upper surface of flange 5. During rotation of nut 4 in valve closing direction sleeve 8 tends to move upwardly with respect to yoke 2.

The valve yoke and nut construction shown and described is of a conventional form selected only for illustration and it is to be understood that the nut 4 need not be confined in the sleeve 8 by the collar 12 and that it is not essential to the present invention to provide a sleeve for the nut. In other words, the driving unit hereinafter set forth is without change applicable to various yoke and nut constructions and to a valve having the nut mounted in the yoke without use of a sleeve for the nut. In fact the nut need not be set into the yoke.

Figure 2:
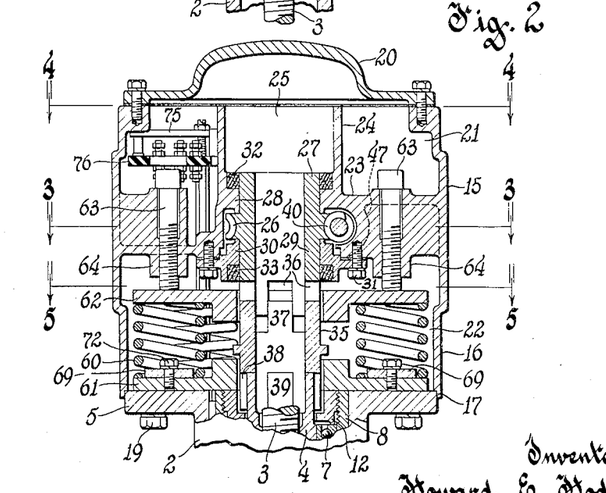
Fig. 2 is a vertical sectional view of the valve operating unit shown in Fig. 1.
Figures 4, 5:
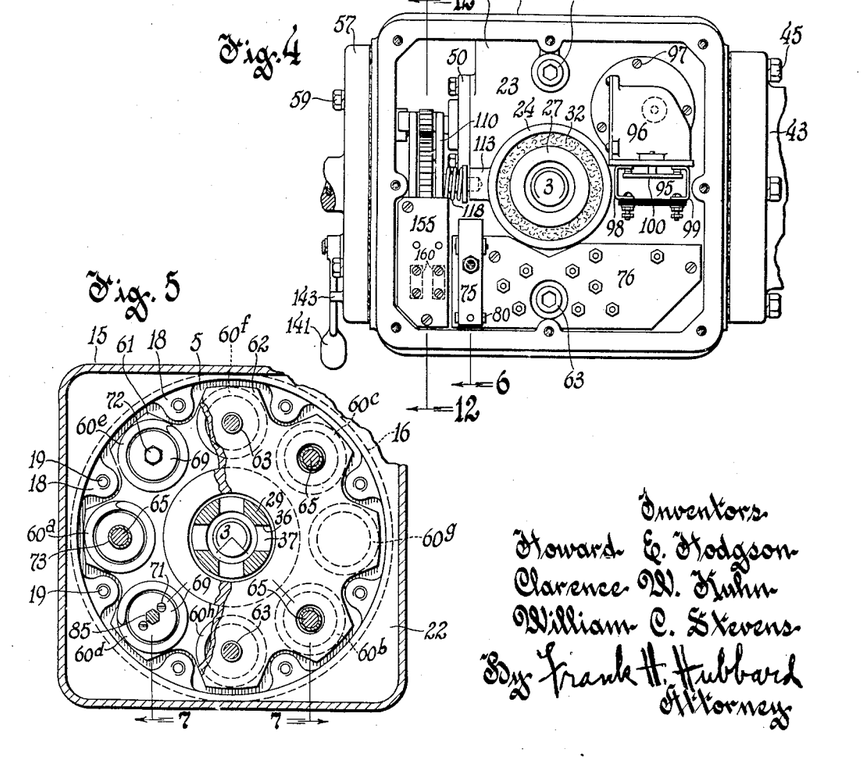
Figures 6, 7, 8, 9, 10, 11:
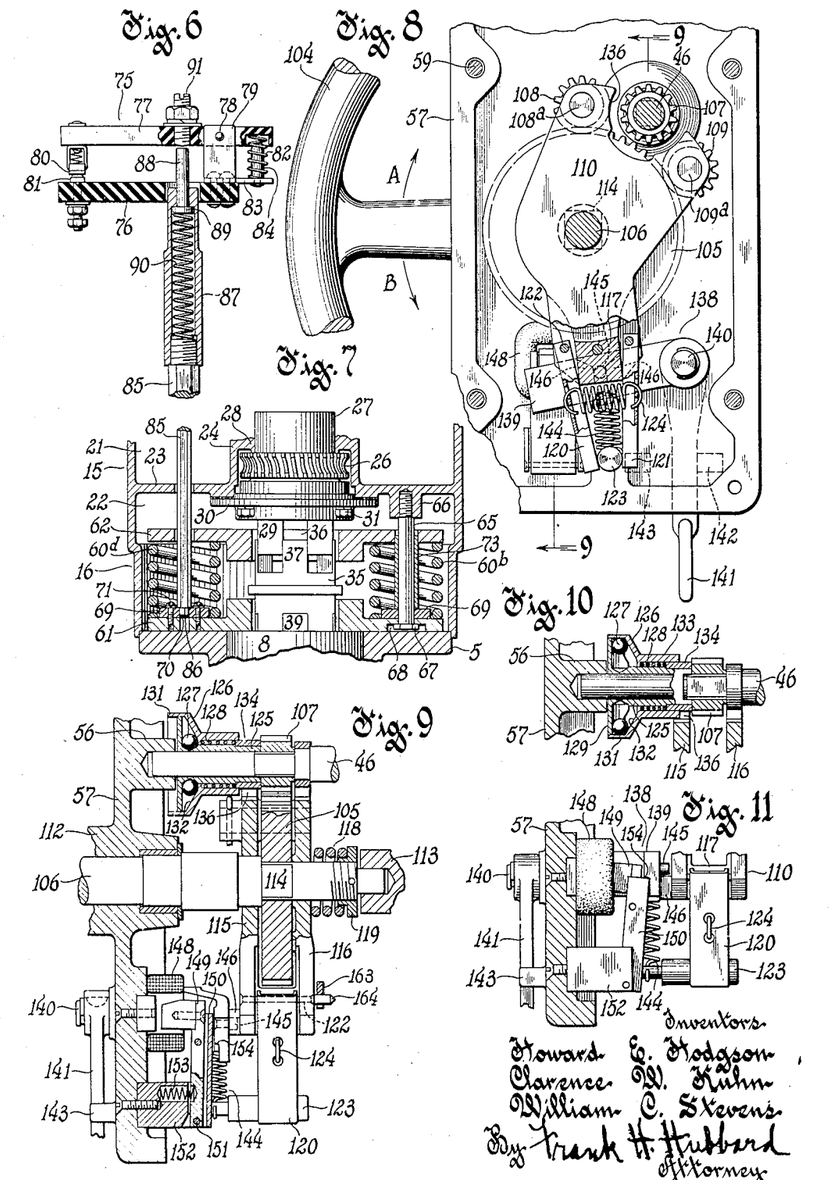
Fig. 6 is a fragmentary sectional view on line 6—6 of Fig. 4.
Fig. 7 is a fragmentary sectional view on lines 7—7 of Fig. 5.
Fig. 8 is a fragmentary sectional view on line 8—8 of Fig. 3.
Figs. 9 and 10 are fragmentary sectional views on line 9—9 of Fig. 8.
Fig. 11 is a side elevational view of certain of the parts shown in Fig. 9 illustrating such parts in another position.

The valve operating unit 1 is provided with an enclosing casing 15 comprising a casting of rectangular form having a circular skirt 16 formed on the under side thereof which is counterbored as shown at 17 to receive the flange 5 of yoke 2. As shown in Figs. 1 and 5 the lower end of skirt 16 is provided with eight equally spaced inwardly extending lugs 18 for engaging the upper face of flange 5 and casing 15 is secured to said flange by cap screws 19 which pass through openings in said flange into tapped openings in said lugs. The upper end of casing 15 is open and is provided with a removable cover 20, and as shown in Figs. 2 and 7 said casing is divided into upper and lower compartments 21 and 22 by a substantially horizontal wall 23. Also as shown in Figs. 2 and 7, wall 23 has a cylindrical projection 24 formed on the upper face thereof which is provided with a circular opening 25.

As shown in Fig. 2, the valve operating nut 4 is coupled to a worm gear 26 mounted within the opening 25 in projection 24. Worm gear 26 is provided with an upwardly extending tubular hub projection 27 which is journaled within a bored opening in a flange projection 28 formed within the opening 25 in projection 24, and said worm gear is also provided with a downwardly extending tubular hub projection 29 which is journaled within a bearing plate 30 secured to the under side of wall 23 by cap screws 31. Worm gear 26 is held between flange 28 and bearing plate 30 to prevent its axial movement, and said flange and plate are counterbored to receive oil seals 32 and 33 respectively which are associated with the end portions of hub projections 27 and 29. The lower end of hub projection 29 is connected to the valve operating nut by a tubular coupling member 35. As shown in Figs. 1 and 2, the lower end of hub projection 29 is provided with slots 36 for receiving a plurality of tongue projections 37 formed on the upper end of coupling member 35 and the lower end of said coupling member is provided with slots 38 for receiving a plurality of tongue projections 39 formed on the upper end of nut 4. Nut 4 is thus coupled to worm gear 26 to rotate therewith, and it should be noted that the tongue and slot connections between coupling member 35 and hub projection 29 permit upward axial movement of nut 4 out of the position shown in Fig. 1.

Figure 3:
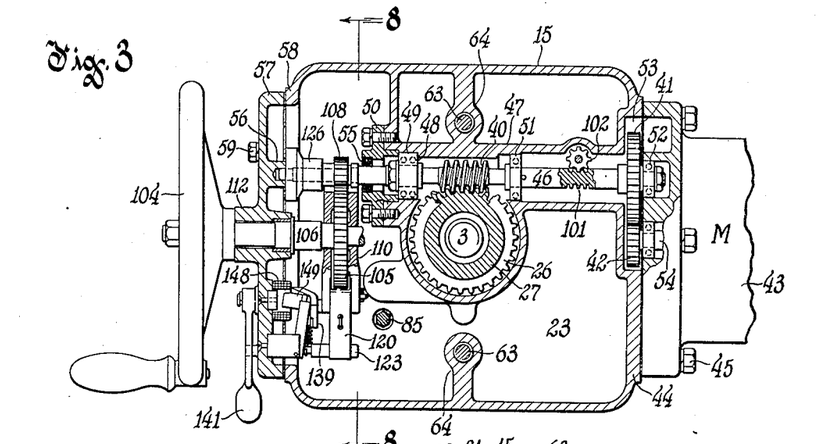
Figs. 3, 4 and 5 are sectional views taken on lines 3—3, 4—4 and 5—5, respectively, of Fig. 2.

As shown in Fig. 3, worm gear 26 has a worm 40 associated therewith which is adapted to be driven through the medium of speed reducing spur gears 41 and 42 by a reversible motor M having a housing 43 which is secured to side wall 44 of casing 15 by screws 45. Worm gear 40 is formed upon a shaft 46 which is rotatably mounted within a horizontally arranged tubular projection 47, formed on wall 23 of casing 15. Shaft 46 is supported adjacent the left end of worm 40 by a combined radial and thrust bearing 48 which is held within a counterbore 49 in the left end of tubular projection 47 by a thrust collar 50. Shaft 46 is also supported within tubular projection 47 by a ball bearing 51 which is located adjacent the right end of worm 40 and the right end of said shaft is supported by a ball bearing 52 which is mounted within an opening in the face of housing 43 of motor M. Wall 44 of casing 15 is formed to provide a recess 53 for receiving the spur gears 41 and 42, and the former spur gear is fixed to shaft 46 while the latter is fixed to the shaft 54 of motor M. Shaft 46 extends through an oil seal 55 carried by thrust collar 50 and the left end thereof is supported within an opening in a lug 56 on a cover plate 57 which is secured to the wall 58 of casing 15 by screws 59.

As is apparent from the foregoing, nut 4 is adapted to be driven in opposite directions by motor M to effect opening and closure of the valve. During rotation of nut 4 in valve closing direction it tends to move upwardly with respect to yoke 2 and the valve operating unit 1 is provided with a thrust responsive spring mechanism which normally restrains said nut but permits movement thereof when a predetermined thrust is applied to valve stem 3 upon seating of the valve. Said spring mechanism is mounted within the lower compartment 22 of casing 15 and as shown in Figs. 2 and 7 the same includes a plurality of vertically arranged helical springs 60 which are held under compression between a pair of horizontally arranged plates 61 and 62. Plate 61 is designed to abut the upper end of sleeve 8 or the nut if said sleeve is omitted and is provided with a center opening for receiving the coupling member 35.

As shown in Fig. 5, plate 61 has its periphery recessed to clear the lugs 18 on the lower end of casing 15 and the springs 60 are arranged intermediate said lugs. Plate 62 is similar to plate 61 and the upper surface thereof abuts a pair of adjusting screws 63—63 which pass through tapped openings in lugs 64—64 formed on wall 23 of casing 15. As is apparent, plate 62 is adjustable axially by the screws 63—63 to vary the degree of compression of springs 60, and it should be noted that the upper ends of said screws are accessible for adjustment upon removal of the cover 20. The plates 61 and 62 are provided with openings for receiving three vertically arranged guide pins 65 and as shown in Fig. 5 said pins are arranged within the springs $60^a$, $60^b$ and $60^c$. The upper ends of said guide pins are provided with threaded portions which are secured within tapped openings in lugs 66 formed on the under side of wall 23, as shown in Fig. 7. Also each of the guide pins 65 has a head 67 on the lower end thereof and the under face of plate 61 is recessed as shown at 68 in Fig. 7 to receive said heads. Plate 61 has washers 69 mounted upon the upper face thereof which engage within the lower ends of springs 60 to prevent displacement of the latter. The washers 69 associated with springs 60a, 60b and 60c are provided with center openings for receiving the guide pins 65, and as shown in Fig. 7 the washer 69 associated with spring 60d is provided with a center opening 70 and is secured to plate 61 by screws 71 disposed on opposite sides of said opening. The washers 69 associated with springs 60e to 60h, inclusive, are each secured to plate 61 by a single screw 72. As is apparent, plate 61 is movable upwardly upon the guide pins 65 against the action of springs 60 and as shown in Fig. 7 said guide pins have sleeves 73 associated therewith which are adapted to engage the lower ends of the lugs 66 on wall 23 to limit upward movement of said plate.

During closure of the valve, springs 60 act through the medium of plate 61 to normally hold the lower end of sleeve 8 in engagement with the shoulder 13 on yoke 2. However, when valve stem 3 is subjected to a predetermined thrust upon seating of the valve the valve operating nut 4 and its associated sleeve are adapted to move upwardly out of normal position against the action of springs 60.

The above described thrust responsive mechanism has a limit switch 75 associated therewith which acts as hereinafter set forth to stop operation of motor M in valve closing direction. As shown in Fig. 4 limit switch 75 is carried by an insulating terminal board 76 which is mounted within the upper compartment 21 of casing 15. As shown in Fig. 6 switch 75 includes a movable insulating lever 77 which is pivotally mounted upon a pin 78 carried by a bracket 79 fixed to the upper face of terminal board 76. Lever 77 carries a bridging contact 80 which cooperates with a pair of stationary contacts 81 mounted upon the upper face of terminal board 76, one of said stationary contacts being shown in Fig. 6. Lever 77 is biased to hold bridging contact 80 in engagement with its associated stationary contacts 81 by a helical spring 82 carried by a projection 83 on bracket 79. Projection 83 also carries a stop pin 84 for limiting opening movement of lever 77 and its associated bridging contact 80.

Switch 75 is operatively connected to plate 61 of the thrust responsive mechanism by a vertically arranged push rod 85 which extends through an opening in wall 23 and plate 62 and has a shouldered portion 86 on the lower end thereof which engages within the opening 70 in washer 60d. The upper end of push rod 85 has a sleeve 87 fixed thereto and the upper end of said sleeve is guided within an opening in terminal board 76 and carries a plunger 88. Plunger 88 is slidable within an opening in the upper end of sleeve 87 and the lower end thereof is provided with an enlarged head 89 which is normally held in engagement with a shoulder on the upper end of said sleeve by a spring 90. Spring 90 is held under compression between the upper end of push rod 85 and the head 89 on plunger 88 and the upper end of said plunger cooperates with a threaded stop 91 which is adjustably mounted within a tapped opening in lever 77.

As hereinbefore stated, the springs 60 act through the medium of plate 61 to normally hold the lower end of sleeve 8 in engagement with the shoulder 13 on yoke 2. With plate 61 in normal position, stop 91 is adjusted to clear the upper end of plunger 88 and bridging contact 80 is thus normally held in engagement with its cooperating stationary contacts 81 under the action of spring 82. Upon initial upward movement of sleeve 8 out of normal position stop 91 is engaged by plunger 88 and bridging contact 80 is moved out of engagement with its associated stationary contacts 81 against the action of spring 82. Opening movement of bridging contact 80 is limited by engagement of lever 77 with the stop pin 84 and upon continued upward movement of plate 61 the plunger 88 is moved inwardly within sleeve 87 against the action of spring 90.

The aforedescribed valve operating mechanism is also provided with a position limit switch 95 which acts as hereinafter set forth to stop operation of motor M upon movement of the valve into open position. Said switch is mounted in the upper compartment 21 of casing 15 and is provided with an enclosing casing 96 which is secured to the upper side of wall 23 by screws 97. Switch 95 includes a pair of insulated stationary contacts 98 and 99 which are mounted upon the casing 96 and a cooperating movable bridging contact 100 which is normally held in circuit closing position. As shown in Fig. 3, switch 95 is driven from shaft 46 through the medium of a worm 101 formed on said shaft and a cooperating worm gear 102, and upon movement of the valve into open position worm gear 102 acts through the medium of a suitable cam mechanism mounted within casing 96 to move bridging contact 100 into open position. The cam mechanism for effecting operation of bridging contact 100 is not illustrated since cam operated limit switches are well known in the art, and the present invention is not concerned therewith.

The worm shaft 46 of the above described valve operating unit has a manual operating mechanism associated therewith including a hand wheel 104 which is normally disconnected from said shaft and is adapted to be automatically coupled thereto when rotated in either direction. As hereinafter set forth, the manual operating mechanism is provided with means for preventing coupling of hand wheel 104 to shaft 46 except upon substantial arrest of the latter, and also has control means associated therewith which insures against energization of the driving motor M of the valve unit during manual operation. Also as hereinafter set forth, the manual operating mechanism has a locking device associated therewith which acts to insure disconnection of hand wheel 104 from the worm shaft 46 upon energization of motor M.

As shown in Figs. 8 and 9 the manual operating mechanism includes a spur gear drive comprising a driving gear 105 fixed to an operating shaft 106, a driven gear 107 fixed to the worm shaft 46, and a pair of pinions 108 and 109 which mesh with the driving gear 105 and are arranged on opposite sides of the driven gear 107. The pinions 108 and 109 are carried by a yoke 110, and as hereinafter set forth said yoke is normally held in the position shown in Fig. 8 to prevent meshing of either of said pinions with driven gear 107.

More specifically, hand wheel 104 is fixed to the outer end of shaft 106, and said shaft is journaled within a bearing projection 112 on cover plate 57 and extends inwardly beyond said plate. Shaft 106 is held against axial movement within bearing projection 112 and the inner end thereof is supported within an opening in a lug 113 (Fig. 4) which is formed on one side of the cylindrical projection 24 in casing 15. Driving gear 105 is fixed to a square section 114 on shaft 106 and yoke 110 is rotatably mounted upon said shaft and is provided with spaced side arms 115 and 116 which are located on opposite sides of said gear. Yoke 110 has a connecting portion 117 on one end thereof which extends between the side arms 115 and 116 and the pinions 108 and 109 are associated with the opposite end of said yoke, the same being rotatably mounted upon pins 108a and 109a, respectively held within openings in said arms.

As shown in Fig. 9, arm 116 of yoke 110 is held in frictional engagement with driving gear 105 by a helical spring 118 which is held under compression between said arm and a collar 119 fixed to shaft 106. Yoke 110 is thus adapted to rotate with gear 105 and upon rotation of hand wheel 104 in the direction of arrow A, Fig. 8, pinion 108 is moved into mesh with gear 107 and upon continued rotation of said hand wheel in the direction of arrow A gear 105 slips with respect to yoke 110 and acts through the medium of said pinion to drive gear 107 and worm shaft 46 in a clockwise direction. Upon rotation of hand wheel 104 in the direction of arrow B, Fig. 8, pinion 109 is moved into mesh with gear 107 and upon continued rotation of said hand wheel in the direction of arrow B gear 105 slips with respect to yoke 110 and acts through the medium of said pinion to drive gear 107 and worm shaft 46 in a counterclockwise direction.

Yoke 110 has a spring mechanism associated therewith for normally holding the same in the position shown in Fig. 8 to prevent meshing of either of the pinions 108 or 109 with the driven gear 107. Such mechanism comprises a pair of fingers 120 and 121 which extend outwardly from yoke 110 and are located on opposite sides of the connecting portion 117 of said yoke. The inner ends of fingers 120 and 121 are pivotally secured to yoke 110 by pins 122 and the outer ends of said fingers are located on opposite sides of a pin 123 fixed to the cover plate 57. Fingers 120 and 121 are biased toward each other by a helical spring 124, and as is apparent said fingers cooperate with pin 123 and connecting portion 117 on yoke 110 to bias said yoke against movement in opposite directions out of the position shown in Fig. 8. Upon rotation of hand wheel 104 in either direction yoke 110 is moved out of normal position by frictional engagement with gear 105 against the action of fingers 120 and 121, and upon release of said hand wheel said fingers act to return said yoke and the parts connected thereto to the normal position shown in Fig. 8 for disengagement of hand wheel 104 from worm shaft 46.

As hereinbefore stated, the manual operating mechanism is provided with means for preventing coupling of hand wheel 104 to the worm shaft 46 except upon substantial arrest of the latter. As shown in Figs. 9 and 10, such means comprises an inner cone element 125 fixed to worm shaft 46, an outer cone element 126 slidably mounted upon said former cone element for movement into and out of locking engagement with yoke 110, and a plurality of balls 127 which are adapted to act by centrifugal force to move said outer cone element into locking engagement with said yoke against the action of a helical spring 128. Inner cone element 125 is held against axial movement between gear 107 and lug 56 on cover 57 and the left end thereof is provided with a flange projection 129 having a cone surface which is radially recessed as shown in Fig. 10 to receive the balls 127. The outer cone element 126 is provided with a cup-shaped portion 131 which surrounds the flange projection 129 on the inner cone element 126 and has a cone surface 132 on the interior thereof corresponding to the cone surface on said inner cone element. Outer cone element 126 is also provided with a sleeve projection 133 which is bored to receive a collar 134 fixed to the right end of cone element 126. Spring 128 is located within the sleeve projection 133 and is held under compression between collar 134 and a shoulder formed on the inner surface of said cone projection. As shown in Fig. 8, the side arm 115 of yoke 110 is provided with a substantially semi-circular recess 136 which is arranged midway between the pinions 108 and 109 and is adapted to receive the sleeve projection 133 on outer cone element 126.

As shown in Fig. 9, outer cone element 126 is normally held out of engagement with side arm 115 of yoke 110 under the action of spring 128. However, when worm shaft 46 is driven by motor M the balls 127 are moved outwardly by centrifugal force from the position shown in Fig. 9 into the position shown in Fig. 10. Upon outward movement of the balls 127 into the position shown in Fig. 10 the same engage cone surface 132 on outer cone element 126 to move said element from the position shown in Fig. 9 into the position shown in Fig. 10. Sleeve projection 133 is then projected into the recess 136 in arm 115 and yoke 110 is thus locked against movement out of the position shown in Fig. 8 to prevent coupling of the hand wheel 104 to worm shaft 46. The outer cone element 126 remains in locking position until worm shaft 46 is brought substantially to rest, whereupon said cone element is returned to the normal position shown in Fig. 9 by spring 128. Upon return of outer cone element 126 to normal position yoke 110 is released to permit coupling of hand wheel 104 to worm shaft 46.

Yoke 110 also has a locking mechanism 138 associated therewith which normally locks said yoke in the position shown in Fig. 8 to prevent coupling of hand wheel 104 to worm shaft 46. Such locking mechanism comprises a lever 139 fixed to a shaft 140 which is rotatably mounted within an opening in cover 57. The outer end of shaft 140 has a manual operating lever 141 fixed thereto which is movable between stop projections 142 and 143 on cover 57. Lever 139 and its associated operating lever 141 are normally held in the position shown in Fig. 8 by a spring 144 having one end connected to said lever and its opposite end connected to pin 123. Lever 139 has a pin 145 fixed thereto which cooperates with a pair of stop projections 146—146 on arm 115 of yoke 110. Pin 145 and lugs 146—146 are shown in dotted lines in Fig. 8 and as shown in this figure said pin is normally located between said lugs to lock yoke 110 in the position shown in Fig. 8 to thereby prevent coupling of hand wheel 104 to worm shaft 46. However, upon movement of operating lever 141 into engagement with stop projection 143 (Fig. 8) pin 145 is moved out of engagement with lugs 146—146 and yoke 110 is then released to permit coupling of hand wheel 104 to worm shaft 46.

Locking mechanism 138 has an electromagnetically controlled latch device associated therewith for holding the same in released position. As shown in Fig. 9 said device comprises a magnet winding 148 mounted upon the inner face of cover 57 and an associated armature 149 having a latch member 150 fixed thereto. Armature 149 and latch member 150 are pivotally mounted upon a pin 151 carried by a post 152 fixed to the inner face of cover 57, and said armature is biased by a spring 153 to yieldingly hold said latch member in engagement with lever 139. Lever 139 is provided with a shoulder 154 and upon movement of said lever into released position said shoulder is engaged by the free end of latch member 150, as shown in Fig. 11, to hold the locking mechanism 138 in released position. As hereinafter set forth, winding 148 is connected in the energizing circuit of motor M and upon energization of said motor, armature 149 is attracted by said winding to move latch member 150 out of engagement with shoulder 154. The locking mechanism 138 is thus automatically released to maintain yoke 110 in the position shown in Fig. 8 upon energization of motor M.

Figure 12:
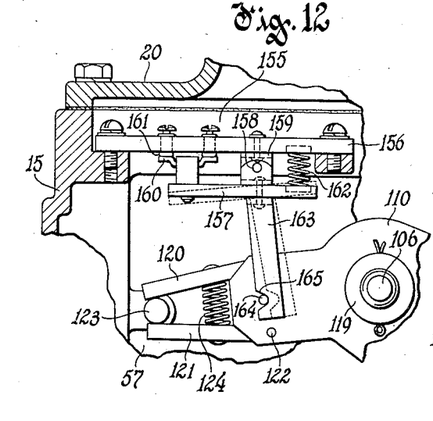
Fig. 12 is a fragmentary sectional view on line 12—12 of Fig. 4.

A switch 155, shown in Fig. 12, is associated with the above described manual operating mechanism and as hereinafter set forth said switch acts to prevent energization of motor M upon coupling of hand wheel 104 to worm shaft 46. Switch 155 is mounted in the upper compartment 21 of casing 15 (Fig. 4) and as shown in Fig. 12 said switch comprises an insulating base 156 having a movable insulating contact lever 157 mounted upon the under side thereof. Contact lever 157 is pivoted intermediate its ends upon a pin 158 carried by a bracket 159 fixed to the under side of base 156, and one end of said contact lever has a pair of bridging contacts 160 mounted thereon which are shown in dotted lines in Fig. 4. As shown in Fig. 12 each of the bridging contacts 160 cooperates with a pair of stationary contacts 161 mounted upon the under side of base 156 and contact lever 157 is biased to hold said bridging contacts in engagement with their associated stationary contacts by a spring 162. Contact lever 157 has an operating arm 163 fixed thereto which extends downwardly and cooperates with a pin 164 fixed to yoke 110. Said operating arm is provided with a notch 165 and upon positioning of yoke 110 in the normal position shown in Fig. 8 pin 164 is located within said notch and the bridging contacts 160 are held in engagement with their associated stationary contacts by spring 162, as shown in Fig. 12. However, upon movement of yoke 110 in either direction out of normal position for coupling of hand wheel 104 to worm shaft 46, pin 164 moves out of engagement with the recess 165 and arm 163 is moved into the dotted line position shown in Fig. 12 to provide for disengagement of bridging contacts 160 with their associated stationary contacts 161.

Figure 18:
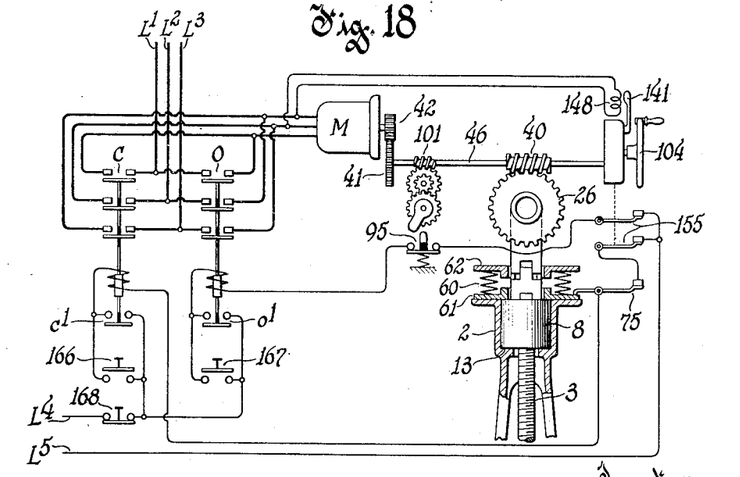
Fig. 18 is a diagrammatic view illustrating the circuit connections for the valve operating units shown in Figs. 1 and 13.

The function and operation of the aforedescribed valve operating mechanism and also the circuit connections therefor will now be more fully set forth in connection with Fig. 18 which schematically illustrates the aforedescribed valve operating unit and the electric control means therefor. Motor M may be of any desired type, the motor shown being of a 3 phase alternating current type to be supplied with current from a circuit indicated by lines $L^1$, $L^2$, $L^3$. The power connections for motor M are controlled by a pair of 3 pole electromagnetically operated reversing switches C and O, the former switch being provided with a set of normally open auxiliary contacts $c^1$, and the latter with a set of normally open auxiliary contacts $o^1$. The control means for the reversing switches C and O includes a pair of normally open start push buttons 166 and 167, and a normally closed stop push button 168.

It is assumed that reversing switch C provides for operation of motor M in a direction to close the valve, and that reversing switch O provides for operation of said motor in a direction to open the valve. The position limit switch 95 of the valve operating unit is connected in the energizing circuit of reversing switch O and the thrust responsive limit switch 75 of said unit is connected in the energizing circuit of reversing switch C. The energizing circuits of switches C and O are also controlled by the switch 155 which is associated with the manual operating mechanism of the unit and the magnet winding 148 associated with said mechanism is permanently connected between two of the terminals of the motor M.

Assuming that the valve is in open position and that it is desired to close the same, push button 166 is depressed to effect closure of reversing switch C for operation of motor M in valve closing direction. Upon depression of push button 166 the operating winding of reversing switch C is connected across a supply circuit indicated by lines $L^4$, $L^5$, through the medium of stop push button 168, the thrust responsive switch 75 and the switch 155 associated with the manual operating mechanism. Upon release of push button 166 reversing switch C is maintained energized through the medium of its auxiliary contacts $c^1$. As hereinbefore set forth, during closure of the valve, springs 60 act through the medium of plate 61 to normally hold the lower end of sleeve 8 in engagement with shoulder 13 on valve yoke 2. However, when valve stem 3 is subjected to a predetermined thrust upon seating of the valve, the valve operating nut and its associated sleeve 8 are moved upwardly out of normal position against the action of springs 60 to effect opening of the thrust responsive switch 75. Upon opening of switch 75 reversing switch C is deenergized to stop operation of motor M in valve closing direction.

Push button 167 is depressed to effect closure of reversing switch O for operation of motor M in valve opening direction. Upon closure of push button 167 the operating winding of reversing switch O is connected across lines $L^4$, $L^5$ through the medium of stop push button 168, the position limit switch 95 and the switch 155 associated with the manual operating mechanism. Upon release of push button 167 reversing switch O is maintained energized through the medium of its auxiliary contacts $o^1$. The position limit switch 95 is set to open upon opening of the valve to a predetermined degree and said limit switch in opening deenergizes reversing switch O to stop operation of motor M in valve opening direction. Opening of stop push button 168 interrupts the energizing circuit of both of the reversing switches O and C, and it is thus apparent that the same provides for stopping of motor M at any point during valve opening or valve closing operations.

As hereinbefore set forth, hand wheel 104 is normally disconnected from worm shaft 46 and is adapted to be automatically coupled thereto when rotated in either direction, but only upon substantial arrest of said worm shaft and release of an associated locking mechanism 138 by a manual operating lever 141. Immediately upon coupling of hand wheel 104 to worm shaft 46 the contacts of switch 155 are opened to prevent establishment of the energizing circuits for reversing switches O and C. Upon disconnection of hand wheel 104 from worm shaft 46 switch 155 is reclosed as hereinbefore set forth to permit motor operation of the valve. As hereinbefore set forth, the locking mechanism 138 has an operating winding 148 associated therewith for maintaining the same in released position, and as shown in Fig. 18 said operating winding is connected across two terminals of motor M whereby the same is energized immediately upon establishment of power connections for said motor.

Yoke 110 is capable of limited movement in opposite directions with respect to sleeve projection 133 on cone element 126 when the latter is in locking position, such movement being sufficient to effect opening of switch 155, but insufficient to effect meshing of pinions 108 or 109 with gear 105. Switch 155 is thus operable by hand wheel 104 for effecting stopping of motor M at any point during valve opening or valve closing operation. However, if desired the diameter of sleeve projection 133 on cone element 126 may be increased to prevent movement of yoke 110 out of normal position when said cone element is in locking position. Switch 155 is thus rendered ineffective to stop motor operation of the unit since the same can only be opened by handwheel 104 when worm shaft 46 is substantially at rest.

If desired the magnet 148 and latch 150 associated with locking mechanism 138 may be omitted. Said locking mechanism is then manually held in released position to permit movement of yoke 110 out of the normal position shown in Fig. 8 and upon coupling of hand wheel 104 to worm shaft 46 one of the stop projections 146 on said yoke is located in the path of pin 145 to maintain said locking mechanism in released position pending return of said yoke to normal position. The yoke 110 returns to normal position under the force of spring 124 when the hand wheel is released and the locking mechanism then resets.

As is apparent, the aforedescribed valve unit is adapted for top mounting upon the yoke of a conventional valve without requiring any substantial modification of the valve structure. Also the various parts of the unit are arranged to provide a compact structure which is removable as a unit without removal of the nut from the valve stem. It should be noted that upon removal of the cover 20 the various limit switches are accessible for adjustment or inspection, and also the adjusting screws 63 are accessible for adjustment of the thrust responsive mechanism for variation of the seating pressure applied to the valve. The above described unit is also advantageous in that the various parts of the manual operating mechanism are carried by the removable cover 57.

Figure 13:
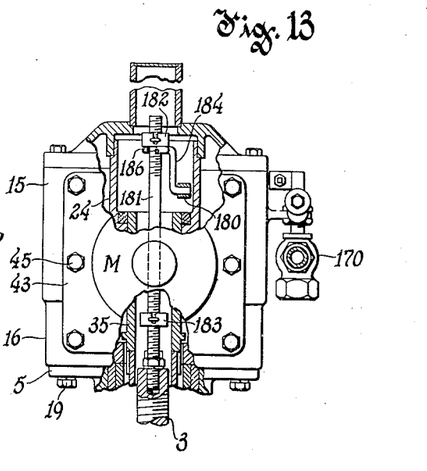
Fig. 13 is a side view partly in section of a modified form of valve operating unit embodying the invention.
Figure 14:
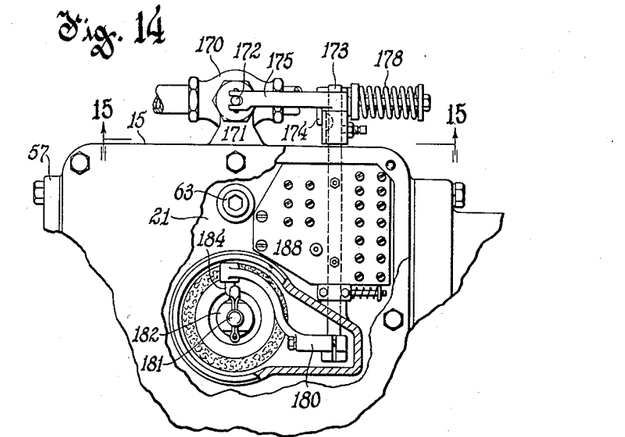
Fig. 14 is a fragmentary plan view of the valve operating unit shown in Fig. 13, a portion of the enclosing casing being broken away and shown in section.

Referring to Figs. 13 and 14, the same illustrate a modification of the aforedescribed valve operating unit which is adapted for use in oil cracking installations. In such installations it is desirable to associate with the valve operating unit an auxiliary valve for admitting steam under pressure into the bonnet of the main valve upon closure of the latter to thereby prevent leakage of high temperature gas into the main valve bonnet. For this purpose the valve operating unit is provided with an auxiliary valve 170 which is mounted upon a projection 171 on one side of the enclosing casing 15. Said valve is of a conventional type having a reciprocable operating stem 172 which is provided with spring biasing means for moving the same upwardly into valve closing position.

The operating mechanism for auxiliary valve 170 includes a rotatable operating shaft 173 which is connected to the stem 172 of said valve through the medium of a pair of levers 174 and 175. Lever 174 is fixed to shaft 173 and extends downwardly therefrom, and lever 175 is rotatably mounted upon said shaft and is pivotally connected to the valve operating stem 172. Lever 175 is provided with a downwardly extending arm 176 which is located to the right of lever 174 (Fig. 15), and the lower end of lever 175 is provided with an adjustable stop 177 for engaging said arm. Arm 176 is yieldingly held in engagement with stop 177 by a spring mechanism 178 and as is apparent in Fig. 15, lever 175 is operated through the medium of said spring mechanism upon rotation of shaft 173 and lever 174 in a clockwise direction.

Shaft 173 is supported within suitable bearings in casing 15 and has a lever 180 fixed thereto which is operated by the valve stem 3. As shown in Fig. 13 valve stem 3 has a threaded pin extension 181 fixed to its upper end which carries a pair of adjustable stops 182—183, and lever 180 carries a link 184 having an eye projection 186 which surrounds said pin extension and is located between said stops.

Figure 15:
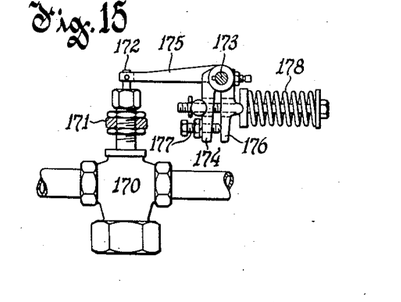
Fig. 15 is a side elevational view of certain of the parts shown in Fig. 14.

During final movement of valve stem 3 into valve closing position stop 182 engages link 184 and lever 180 is moved downwardly to effect counterclockwise rotation of shaft 173 and lever 174 and 175 out of the position shown in Fig. 15. The stem 172 of auxiliary valve 170 is thus moved downwardly to open said valve for admission of steam into the main valve bonnet. Upon movement of valve stem 3 upwardly out of valve closing position, stop 182 moves out of engagement with link 184 and auxiliary valve 170 is permitted to return to closed position under the action of its associated biasing means. During final upward movement of valve stem 3 into valve opening position stop 183 engages link 184 and lever 180 is moved upwardly to effect clockwise rotation of shaft 173 and lever 174 out of the position shown in Fig. 15. Since the auxiliary valve 170 is now in closed position lever 175 is held against clockwise rotation out of the position shown in Fig. 15, and lever 174 is thus moved with respect to arm 176 of lever 175 against the action of spring mechanism 178. As is apparent, spring mechanism 178 then acts to bias lever 175 upwardly to insure tight closure of the auxiliary valve 170.

In the embodiment shown in Fig. 14 a position limit switch 188 is substituted for the limit switch 95 (Fig. 4), said switch being mounted in the upper compartment 21 of casing 15 and being operable by shaft 173.

Figure 16:
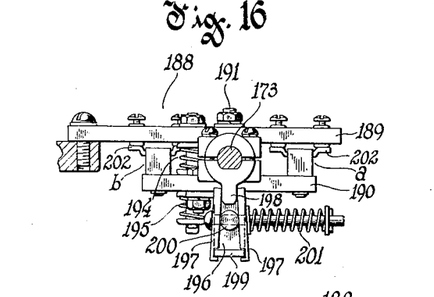
Fig. 16 is an end elevational view of a limit switch shown in Fig. 14.
Figure 17:
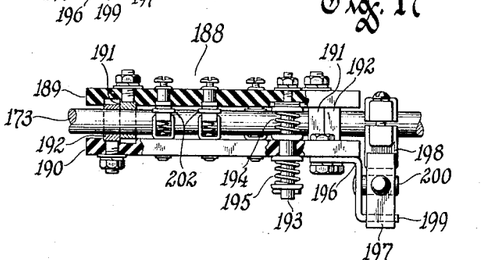
Fig. 17 is a side view partly in section of the switch illustrated in Fig. 16.

As shown in Figs. 16 and 17, switch 188 is provided with a stationary insulating base 189 which is horizontally arranged above the shaft 173 and a movable insulating base 190 which is arranged below said shaft. Insulating base 189 has a pair of bearings 191 fixed to the underside thereof for receiving shaft 173 and the movable insulating base 190 has a pair of bearings 192 fixed to the upper side thereof which are rotatably mounted upon said shaft. Insulating base 190 is normally held in the position shown in Fig. 16 by a spring mechanism 193. Such mechanism includes a spring 194 for opposing clockwise rotation of insulating base 190 out of normal position and a spring 195 for opposing counterclockwise rotation of said base out of such position.

Insulating base 190 has a downwardly extending bracket 196 fixed to the underside thereof which is operatively connected by a pair of vertically arranged fingers 197 to a downwardly extending lever 198 fixed to the shaft 173. The lower ends of fingers 197 are pivotally mounted upon opposite sides of a projection 199 on the lower end of bracket 196 and the upper ends of said fingers are disposed on opposite sides of lever 198. Bracket 196 has a pin 200 fixed thereto which is located between fingers 197 and said bracket also carries a spring mechanism 201 for biasing said fingers toward each other. As is apparent, the fingers 197 cooperate with lever 198 and pin 200 to produce a yielding operating connection between shaft 173 and the movable insulating base 190.

Insulating base 190 has a plurality of bridging contacts 202 yieldingly mounted upon the upper face thereof, each of which normally engages a pair of stationary contacts mounted upon the underside of stationary insulating base 189. The bridging contacts 202 are arranged in groups $a$ and $b$ on opposite sides of shaft 173 and the bridging contacts of group $a$ are opened by a clockwise rotation of insulating base 190 out of normal position, while the bridging contacts of group $b$ are opened by counterclockwise rotation of said insulating base out of normal position.

As hereinbefore set forth, during final movement of valve stem 3 into valve closing position stop 182 engages link 184 to effect counterclockwise rotation of shaft 173. Upon counterclockwise rotation of shaft 173, lever 198 acts through the medium of fingers 197 to rotate insulating base 190 in a corresponding direction out of the position shown in Fig. 16 for disengagement of the bridging contacts 202 of group $b$ from their associated stationary contacts. Also as hereinbefore set forth, during final movement of valve stem 3 into valve opening position stop 183 engages link 184 to effect clockwise rotation of shaft 173. Upon clockwise rotation of shaft 173, lever 198 acts through the medium of finger 197 to rotate insulating base 190 in a corresponding direction out of the position shown in Fig. 16 for disengagement of bridging contacts 202 of group $a$ from their associated stationary contacts.

One of the bridging contacts 202 of group $a$ controls the energizing circuit of switch O (Fig. 18) to effect deenergization of said switch upon movement of valve stem 3 into open position. The other contacts of switch 188 are used to control signal lamp circuits and interlocking circuits in an oil cracking control system, but the function of these contacts need not be considered since the present invention is not concerned therewith.

As hereinbefore indicated, the aforedescribed drive unit inclusive of the thrust taking means is applicable also to that type of valve operable through the medium of a rotating stem or spindle coacting with a non-rotatable but axially movable nut. Thus it is to be understood that the different type of valve operating medium herein disclosed is referred to in the appended claims primarily for brevity and clarity of said claims which are intended to comprehend the aforementioned and other equivalents of the valve operating medium referred to therein.

What we claim as new and desire to secure by Letters Patent is:

1. In a drive for a valve or the like operable through the medium of an axially movable stem and a rotating nut threaded on said stem and limited in axial movement in one direction, in combination, yielding means to take the thrust of said nut in a reverse direction, a drive mechanism for said nut and a supporting structure supporting both said mechanism and said yielding thrust taking means to form a unit which in an assembled state may be mounted on the device to be driven, bringing both said mechanism and said thrust taking means into operative relation to said nut and which may be removed in an assembled state while said nut remains on the device to be driven.

2. In a drive for a valve or the like through the medium of an axially movable stem and a rotating nut threaded on said stem and limited in axial movement in one direction, in combination, yielding means to take the thrust of said nut in a reverse direction, a drive mechanism for said nut and a supporting structure supporting both said mechanism and said yielding thrust taking means to form a unit which in an assembled state may be mounted on the device to be driven, bringing both said mechanism and said thrust taking means into operative relation to said nut and which may be removed in an assembled state while said nut remains on the device to be driven, said thrust taking means being positioned intermediate said drive mechanism and the device to be driven, and said drive mechanism having an operating connection with said nut permitting the latter to move axially while said supporting structure and said drive mechanism remain in a fixed position.

3. In a drive for a valve or the like operable through the medium of an axially movable stem and a rotating nut threaded on said stem and limited in axial movement in one direction, in combination, yielding means to take the thrust of said nut in a reverse direction, a drive mechanism for said nut and a supporting structure for said mechanism and said yielding thrust taking means to form a unit which in an assembled state may be mounted on the device to be driven, bringing both said mechanism and said thrust taking means into operative relation to said nut and which may be removed in an assembled state while said nut remains on the device to be driven, said supporting structure comprising a housing for said mechanism and said thrust taking means, which housing has means to secure it in a fixed position on the device to be driven, said thrust taking means being positioned intermediate said drive mechanism and the device to be driven and said drive mechanism having an operating connection with said nut permitting the latter to move axially independently of said drive mechanism.

4. In a drive for a valve or the like operable through the medium of an axially movable stem and a rotating nut threaded on said stem and limited in axial movement in one direction, in combination, an annular spring pressed member to surround said stem and to cooperate with said nut to take the thrust of the latter in a reverse direction, a drive mechanism having a part to surround said stem and to afford a drive connection with said nut extending through the center opening of said annular thrust taking member, said drive connection permitting axial movement of said nut independently of said drive mechanism, and a supporting structure supporting both said drive mechanism and said spring pressed annular thrust taking member to form a unit which in an assembled state may be mounted on the device to be driven, bringing both said drive mechanism and said thrust taking member into operative relation to said nut and which may be removed while said nut remains on said stem.

5. In a drive for a valve or the like operable through the medium of an axially movable stem and a rotating nut threaded on said stem and limited in movement in one direction, in combination, an annular spring pressed member to surround said stem and to cooperate with said nut to take the thrust of the latter in a reverse direction, a drive mechanism having a rotatable part to surround said stem and to afford a drive connection with said nut extending through the center opening of said annular thrust taking member, said drive connection permitting axial movement of said nut independently of said drive mechanism and a supporting structure supporting both said drive mechanism and said spring pressed annular thrust taking member to form a unit which in an assembled state may be mounted on the device to be driven, bringing both said drive mechanism and said thrust taking member into operative relation to said nut and which may be removed while said nut remains on said stem, said supporting structure comprising a housing having an opening to receive said stem and to expose said thrust taking member for co-action with said nut and said supporting structure having means to secure it in a fixed position on the device to be driven.

6. In a drive for a valve or the like operable through the medium of an axially movable stem and a rotating nut threaded on said stem and limited in axial movement in one direction, in combination, an annular spring pressed member to surround said stem and to cooperate with said nut to take the thrust of the latter in a reverse direction, a drive mechanism having a rotatable part to surround said stem and to afford a drive connection with said nut extending through the center opening of said annular thrust taking member, said drive connection permitting axial movement of said nut independently of said drive mechanism, and a supporting structure supporting both said drive mechanism and said spring pressed annular thrust taking member, said supporting structure having means to secure the same in a fixed position on the device to be driven and comprising a housing divided into compartments respectively to house said drive mechanism and said spring pressed thrust taking member, the latter compartment being immediately adjacent the device to be driven and the unit thus provided being in an assembled state removable from the device to be driven while said nut remains on said device.

7. In a drive for a valve or the like operable through the medium of an axially movable stem and a rotating nut threaded on said stem and limited in axial movement in one direction, in combination, an annular yielding thrust taking device to surround said stem and to cooperate with said nut to take the thrust of the latter in a reverse direction, said thrust taking device comprising annular plates and a plurality of interposed helical springs, a drive mechanism having a rotatable part to surround said stem and to afford a drive connection with said nut extending through the center opening in said annular thrust taking device, said drive connection permitting axial movement of said nut independently of said drive mechanism and a supporting structure for supporting both said drive mechanism and said thrust taking device, said supporting structure having means to secure the same in a fixed position on the device to be driven and comprising a housing for both said drive mechanism and said thrust taking device, said thrust taking device having within said housing readily accessible adjusting means for compression adjustment of its several springs.

8. In a drive for a valve or the like operable through the medium of an axially movable stem and a rotating nut threaded on said stem and limited in axial movement in one direction, in combination, non-rotatable yielding means to take the thrust of said nut in a reverse direction, a drive mechanism for said nut having a drive connection with said nut permitting axial movement of the latter while said drive mechanism remains in fixed position and a limit switch for said drive mechanism operable through the medium of said thrust taking means by said nut when moved axially against said means.

9. In a drive for a valve or the like operable through the medium of an axially movable stem and a rotating nut threaded on said stem and limited in axial movement in one direction, in combination, an annular spring pressed member to surround said stem and to cooperate with said nut to take the thrust of the latter in a reverse direction, said thrust taking member being restrained against rotation, a drive mechanism having a rotatable part to surround said stem and to afford a drive connection with said nut extending through the center opening of said annular thrust taking member and permitting limited axial movement of said nut independently of said drive mechanism, and a limit switch for said drive mechanism operable through the medium of said thrust taking member by said nut upon axial movement of the latter against said thrust taking member.

10. In a drive for a valve or the like operable through the medium of an axially movable stem and a rotating nut threaded on said stem and limited in axial movement in one direction, in combination, non-rotatable yielding means to take the thrust of said nut in a reverse direction, a drive mechanism for said nut, a supporting structure supporting and housing both said mechanism and said yielding thrust taking means to form a unit which in an assembled state may be mounted on the device to be driven, bringing both said mechanism and said thrust taking means into operative relation to said nut and which may be removed in an assembled state while said nut remains on the device to be driven, and a limit switch for said drive mechanism also carried and housed by said supporting structure for operation through the medium of said yielding thrust taking means upon axial movement of said nut opposed by said thrust taking means.

11. In a unit type operating mechanism for valves having a non-rotating threaded stem, a yoke through which the stem extends and a nut on the stem, in combination, a motor, means affording driving connections between said motor and the nut and including a hollow rotatable element to surround the stem with clearance therefrom, said hollow rotatable element having means to engage the nut to cause it to rotate therewith while permitting independently thereof a limited movement of the nut with or axially along the stem in a direction away from the yoke, a spring thrust mechanism comprising an annular element separate from but engageable with the nut to oppose the aforementioned limited movement of the nut in a direction away from the yoke, a limit switch mechanism for said motor comprising means affording circuit disconnection of said motor as a function of resistance to axial movement of the stem in a given direction and a casing carrying said motor and attachable to the yoke for fixed positioning thereon, said casing receiving therewithin and supporting said connecting means, said spring thrust mechanism and said limit switch mechanism to afford a self-contained operative unit including all of said parts received therewithin and also said motor.

12. In a unit type operating mechanism for valves having a non-rotating threaded stem, a yoke through which the stem extends and a nut on the stem, in combination, a motor, means affording driving connections between said motor and the nut and including a hollow rotatable element to surround the stem with clearance therefrom, said hollow rotatable element being geared to said motor and having means to engage the nut to cause it to rotate therewith while permitting independently thereof a limited movement of the nut with or axially along the stem in a direction away from the yoke, an annular spring thrust mechanism concentric with said hollow rotatable element and comprising an annular element separate from but engageable with the nut to oppose the aforementioned limited movement of the nut in a direction away from the yoke, a limit switch mechanism for said motor comprising means affording circuit disconnection of said motor as a function of resistance to axial movement of the stem in a given direction and a casing carrying said motor and enclosing and supporting said connecting means, said spring thrust mechanism and said limit switch mechanism to afford a self-contained unit which includes and holds in assembled relation all of said parts enclosed thereby and also said motor and which functions with said casing secured to the yoke immovably and with said casing as the only tie to the yoke.

13. In a unit type operating mechanism for a valve having a non-rotating threaded stem, a yoke through which the stem extends and a nut on the stem, in combination, a casing to fit upon the yoke and to house a portion of the stem and at least a portion of the nut, a motor carried by said casing, means carried within said casing affording driving connections between said motor and the nut and permitting the nut limited movement with or axially along the stem in a direction away from the yoke, spring thrust means carried by and within said casing in thrust relation to the nut to oppose the aforementioned limited movement of the nut in a direction away from the yoke, limit switch mechanism for said motor carried by and within said casing, and means carried by said casing to afford hand operation of the nut, said casing and all of said parts carried thereby constituting a self-contained unit which may be mounted in a fixed position on the yoke and which requires attachment to the yoke of only said casing.

14. In a power drive of the spring thrust type for a valve having an axially movable stem, in combination, a spring thrust device, an electric motor, means comprising reduction gearing and forming with said thrust device and said motor a compact driving unit for mounting on the end of the valve with said spring thrust device disposed to take the thrust of the stem of the valve in one direction, and control means for said motor including limit means automatically to effect disconnection of said motor from circuit, the aforestated combination including means rendering progressive the building up of thrust in said device and the operation of said limit means and definitely limiting the building up of thrust in said device incident to operation of said limit means, for reserve capacity of said device thereafter to take stem thrust due to thermal changes.

15. In a power drive of the spring thrust type for a valve having an axially movable stem, in combination, a spring thrust device, an electric motor, means comprising reduction gearing and forming with said thrust device and said motor a driving unit for mounting on the valve with said spring thrust device disposed between said reduction gearing and the valve and disposed to take the thrust of the stem of the valve in one direction, and control means for said motor including automatic limit means to effect disconnection of said motor from circuit subsequent to building up a thrust in said device to retain the stem under pressure, said thrust device being adjustable for a given thrust when said limit means operates and under all conditions permitting stem movement due to thermal changes.

HOWARD E. HODGSON.
CLARENCE W. KUHN.
WILLIAM C. STEVENS.